United States Patent [19]
Tomasicchio et al.

[11] Patent Number: 5,779,989
[45] Date of Patent: Jul. 14, 1998

[54] FLUIDIZED BED REACTOR WITH GAS DISTRIBUTOR AND BAFFLE

[75] Inventors: George Tomasicchio, Milan, Italy; Alfredo E. Basas, Bethel, Conn.

[73] Assignee: Dorr-Oliver Incorporated, Milford, Conn.

[21] Appl. No.: 552,243

[22] Filed: Nov. 2, 1995

[51] Int. Cl.[6] ..................................... F27B 15/10
[52] U.S. Cl. .................. 422/145; 34/369; 34/588; 422/141; 431/170
[58] Field of Search ..................... 422/141, 145, 422/240; 34/369, 588; 431/170

[56] References Cited

U.S. PATENT DOCUMENTS

| | | |
|---|---|---|
| 3,236,607 | 2/1966 | Porter, Jr. et al. ............... 422/141 |
| 3,998,929 | 12/1976 | Leyshon . |
| 4,017,585 | 4/1977 | Angevine et al. . |
| 4,073,064 | 2/1978 | Steever et al. . |
| 4,083,929 | 4/1978 | Priestley . |
| 4,085,516 | 4/1978 | Jukkola et al. . |
| 4,106,210 | 8/1978 | Jukkola . |
| 4,159,682 | 7/1979 | Fitch et al. . |
| 4,202,774 | 5/1980 | Kos . |
| 4,304,754 | 12/1981 | Jukkola . |
| 4,314,967 | 2/1982 | Kwon et al. . |
| 5,063,028 | 11/1991 | Humble et al. ................. 422/240 |
| 5,184,671 | 2/1993 | Alliston et al. ................. 422/141 |
| 5,254,318 | 10/1993 | Williams et al. ............... 422/240 |
| 5,406,718 | 4/1995 | Stein .............................. 422/141 |

OTHER PUBLICATIONS

"Fluid Bed Combustion For Waste Incineration", Bulletin No. FS-3 REV 1990.
"Fluid Bed Combustion And Its Application To The Incineration Of Hazardous Waste", Aug. 7 to 12, 1988, Engineering Foundation on Hazardous Waste Management Technologies Mercersburg Academy, Mercersburg, PA, Technical Reprint No. 7755.

*Primary Examiner*—Timothy McMahon
*Attorney, Agent, or Firm*—McCormick, Paulding & Huber

[57] ABSTRACT

An improved fluidized bed reactor having a reactor shell and a reaction chamber within the shell, the reaction chamber having chamber walls and a chamber bottom portion, the improvement comprising at least one baffle disposed within the reaction chamber, the baffle comprising a pair of outer refractory walls, an inner refractory wall between and contiguous with the outer refractory walls, and a metallic reinforcement member embedded within the inner refractory wall, the inner and outer walls being attached to at least the chamber bottom portion.

13 Claims, 11 Drawing Sheets

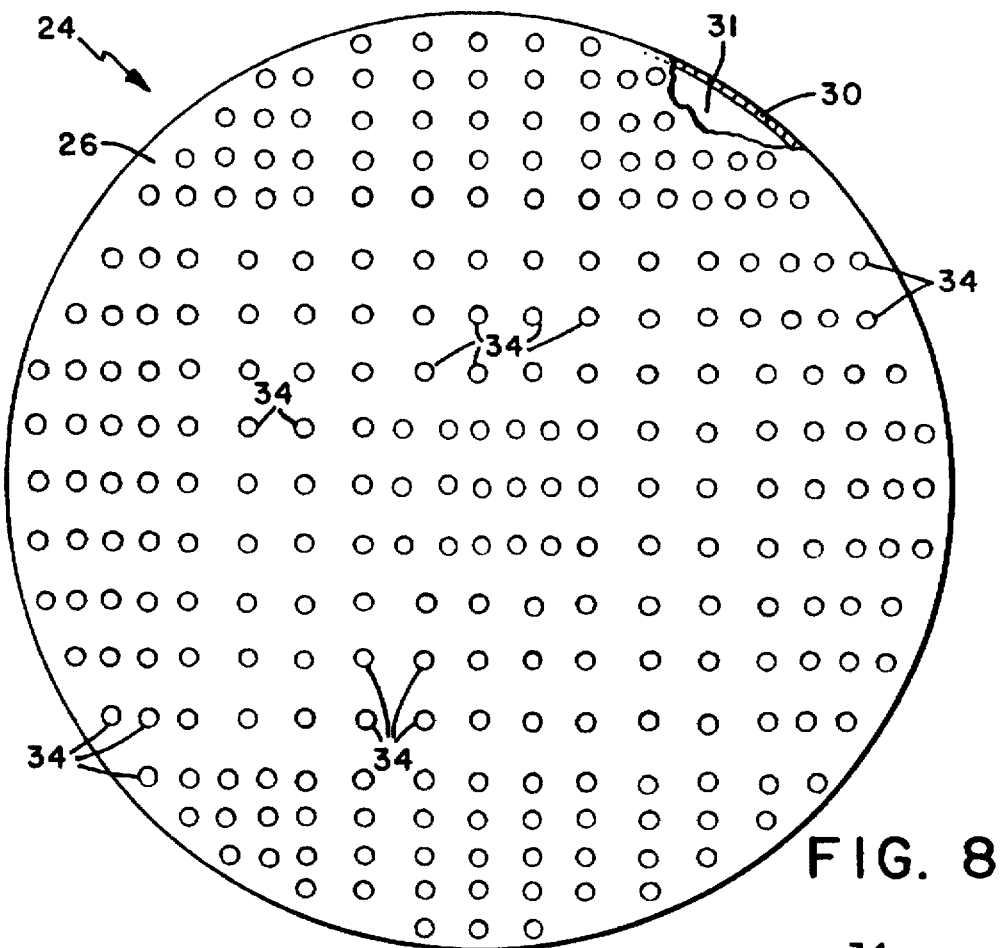
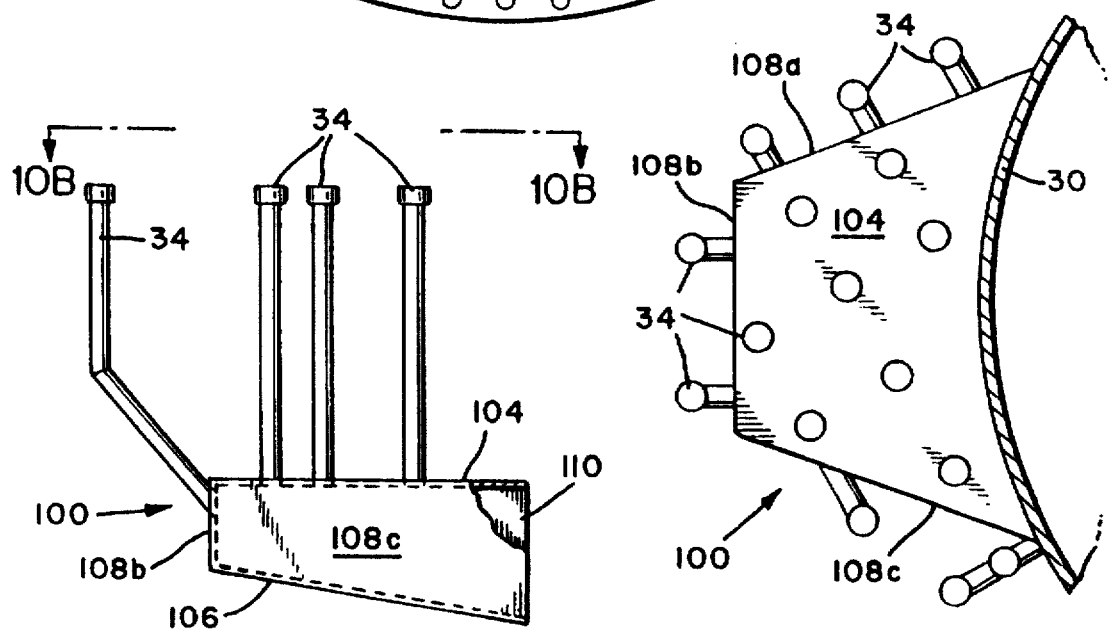

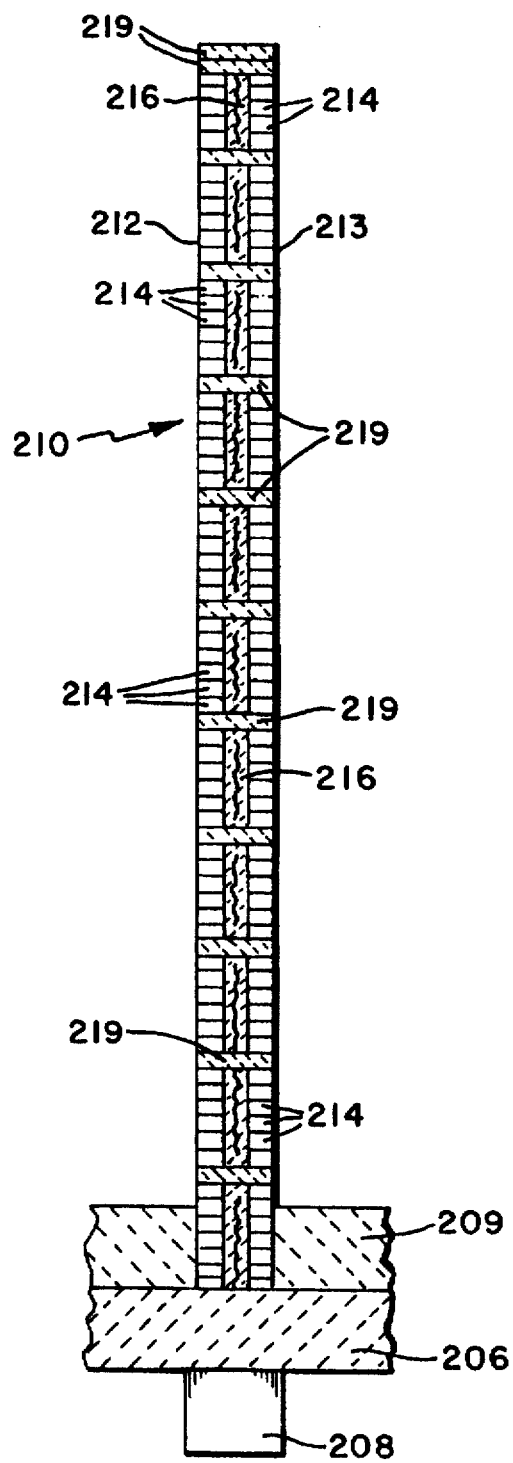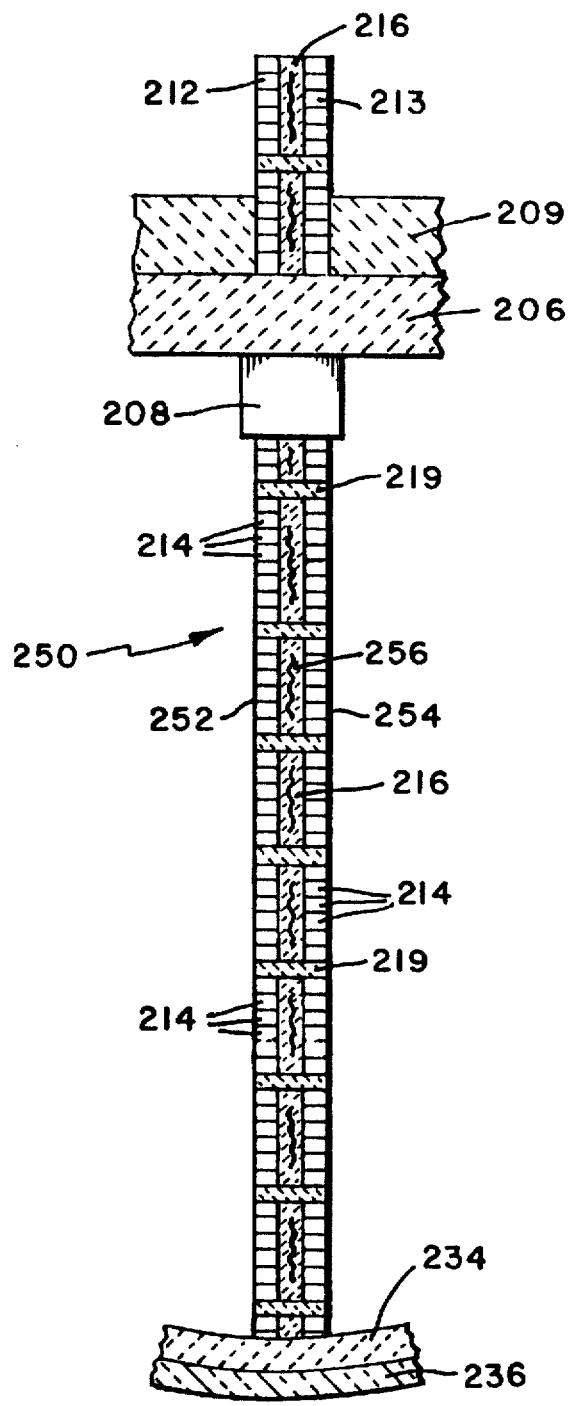
FIG. 14
FIG. 16

1

FLUIDIZED BED REACTOR WITH GAS DISTRIBUTOR AND BAFFLE

BACKGROUND OF THE INVENTION

1. Field of the Invention

The present invention is related to fluidized bed reactors.

2. Problems to be Solved

Fluidized bed reactors are typically used to process waste or sewage. One type of conventional fluidized bed reactor incorporates a self supporting refractory brick arch or dome located below the fluidized bed. As used herein, the term "refractory" is defined as materials of the ceramic type, such as pre-fired clay. The refractory bricks are fitted with tuyeres to distribute gas to the fluidized bed. One problem with this type of reactor is that the weight of the refractory brick arch, and the weight of the bed when not fluidized, as well as the thermal stresses induced in the arch during operation, can impose large horizontal and radial forces on the reactor shell or walls. As such, it is the conventional practice to place a metal band, known as a "belly band", around the reactor to help contain the forces. However, the load carrying capability of the band is limited by size and material restrictions. Another problem is that the maximum size of the refractory brick arch, and therefore the maximum processing area, is limited by the load carrying capabilities of the bricks. When a certain diameter is attained, the arch will no longer be self supporting. Thus, the maximum achievable arch or dome diameter limits the diameter of the reactor. A further problem is that the refractory brick arch is pressurized with gas which passes through the tuyeres. The gas differential pressure across the tuyeres results in pressure on the refractory arch or dome. This pressure tends to lift the arch which is kept in its normal position by the weight of the arch or dome. Thus, such a problem limits the maximum allowable pressure of gas distributed by the tuyeres. Thus, the maximum achievable size of the arch bricks or the dome limit the maximum achievable pressure drop across the tuyeres. Furthermore, the gas distributed by the tuyeres tends to escape through any crevices or spaces between the bricks of the arch and enters the fluidized bed.

Another type of fluidized bed reactor incorporates metallic plates or dished-metal heads instead of a refractory brick arch. One problem with this type of reactor is that the maximum reactor diameter is limited by the maximum available size of the dished-head. The size of the dished-head is limited by acceptable stresses and expansions produced by variation in temperatures. Furthermore, as a consequence of warping and deformation resulting from the high process temperatures, it is difficult to ensure free expansion of the dished-head, as well as the integrity of mechanical seals as the gas differential pressure across the tuyeres increases. This problem becomes more acute as the size of the dished-head increases.

Conventional fluidized bed reactors typically utilize baffles for dividing the fluidized bed into sections. Dividing a bed area into sections provides process advantages in solids flow and in time and/or temperature dependent reactions. These baffles are typically used in an atmosphere of high temperature and heavy turbulence. Furthermore, the atmosphere within which the baffles are used are typically conducive to corrosion. A turbulent fluid bed imparts additional lateral loads on the baffles. Turbulent fluid beds also cause abrasion to the baffles.

Two (2) types of conventional baffles that have been used are steel alloy baffles and refractory baffles. Steel alloy baffles are used primarily for their strength at high temperatures. Specific alloys are chosen which are resistant to corrosion when exposed to specific chemicals. However, steel alloy baffles are not abrasion-resistant and have a high thermal expansion. Furthermore, steel alloy baffles are very sensitive to temperature and each alloy has its own maximum temperature limit. Additionally, alloy baffles are susceptible to warpage due to the relatively high rate of thermal expansion.

Refractory baffles have a relatively lower rate of thermal expansion, are more stable and have a relatively higher temperature limit in comparison to steel alloy baffles. Furthermore, refractory baffles are substantially unaffected by temperature fluctuations. Additionally, refractory baffles are relatively more resistant to abrasion and corrosion than steel alloy baffles. However, refractory baffles have a relatively lower resistance to tensile loads. Furthermore, refractory baffles are relatively more porous and are susceptible to cracking and spalling.

Bearing in mind the problems and deficiencies of conventional fluidized bed reactors, it is therefore an object of the present invention to provide a new and improved fluidizing gas distribution system for a fluidized bed reactor that does not limit the size of the fluidized bed reactor.

It is another object of the present invention to provide a new and improved fluidizing gas distribution system that can withstand relatively high pressure drops across the tuyeres.

It is a further object of the present invention to provide a new and improved fluidized bed reactor that substantially eliminates leakage of fluidizing gas into the fluid bed.

It is another object of the present invention to provide a new and improved fluidized gas distribution system that can freely expand and contract within a fluid bed reactor in response to variations in pressure and temperature within the reactor.

It is a further object of the present invention to provide a new and improved baffle design that has a relatively lower thermal expansion over variations of temperature and pressure within the reactor.

It another object of the present invention to provide a new and improved baffle design that is relatively more resistant to abrasion and corrosion.

SUMMARY OF THE INVENTION

The above and other objects and advantages, which will be apparent to those skilled in the art, are achieved in the present invention which is directed to, in a first aspect, an improved fluidized bed reactor having a reactor shell and a reaction chamber within the shell, the reaction chamber having chamber walls and a chamber bottom portion, the improvement comprising at least one baffle disposed within the reaction chamber, the baffle comprising a pair of outer refractory walls, an inner refractory wall between and contiguous with the outer refractory walls, and a metallic reinforcement member embedded within the inner refractory wall, the inner and outer walls being attached to at least the chamber bottom portion.

In a related aspect, the present invention is directed to an improved fluidized bed reactor having a reactor shell and at least one reactor subsystem within the shell, the reactor subsystem having a reaction chamber, the reaction chamber having chamber walls and a chamber bottom portion, the improvement comprising:

at least one fluidizing gas distributor positioned beneath the reaction chamber, the distributor comprising a top portion, a bottom portion and a sidewall contiguous with the top portion and the distributor bottom portion to define an interior, the distributor bottom portion having an inlet formed therein for introducing a fluidizing gas to the interior, a plurality of tuyeres attached to the top portion of the distributor for providing gaseous communication between the reaction chamber and the distributor interior; and at least one baffle disposed within the reaction chamber, the baffle comprising a pair of outer refractory walls, an inner refractory wall between and contiguous with the outer refractory walls, and a metallic reinforcement member embedded within the inner refractory wall, the inner and outer walls being attached to at least the chamber bottom portion. In a further aspect, the present invention is directed to a fluidized bed reactor comprising:

a reactor shell having a reaction chamber within the shell, the reaction chamber having chamber walls and a chamber bottom portion; and at least one baffle disposed within the reaction chamber, the baffle comprising a pair of outer refractory walls, an inner refractory wall between and contiguous with the outer refractory walls, and a metallic reinforcement member embedded within the inner refractory wall, the walls being attached to at least the chamber bottom portion.

In a related aspect, the present invention is directed to an improved fluidized bed reactor having a reactor shell and at least one reactor subsystem within the shell, the reactor subsystem having a reaction chamber and a wall, the improvement comprising at least one fluidizing gas distributor associated with the reactor subsystem and positioned below the reaction chamber and supported by a base portion of the wall, the distributor comprising a top portion, a bottom portion, and a sidewall contiguous with the top portion and the bottom portion thereby defining an interior, a plurality of tuyeres attached to the top portion of the distributor to provide gaseous communication between the reaction chamber and the interior, and an inlet in the bottom portion for introducing a fluidizing gas to the interior.

In a related aspect, a fluidized bed reactor comprising:
(a) a reactor shell and at least one reactor subsystem within the shell and having a reaction chamber, the reactor subsystem having a wall; and
(b) at least one fluidizing gas distributor positioned beneath the reaction chamber, the distributor comprising (i) a top portion, a bottom portion and a sidewall contiguous with the top portion and the bottom portion to define an interior, the bottom portion having an inlet formed therein for introducing a fluidizing gas to the interior, (ii) a plurality of tuyeres attached to the top portion of the distributor for providing gaseous communication between the reaction chamber and the distributor interior, (iii) a nozzle in gaseous communication with the inlet in the bottom portion for introducing a fluidizing gas to the distributor interior, and (iv) a support structure having a first portion attached to the distributor and a second portion rigidly attached to the wall of the reaction chamber, the first portion being movable with respect to the second portion to allow the fluidizing gas distributor to move in response to variations in temperature and pressure within the reactor subsystem.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 8 is a view taken along line 8—8 of FIG. 3.

FIG. 10A shows a side elevational view of the extension shown in FIG. 9.

FIG. 10B is a view taken along line 10B—10B of FIG. 10A.

FIG. 14 is a view taken along line 14—14 of FIG. 13.

FIG. 16 is a view taken along line 16—16 of FIG. 15.

DESCRIPTION OF THE PREFERRED EMBODIMENTS

Figure 1:
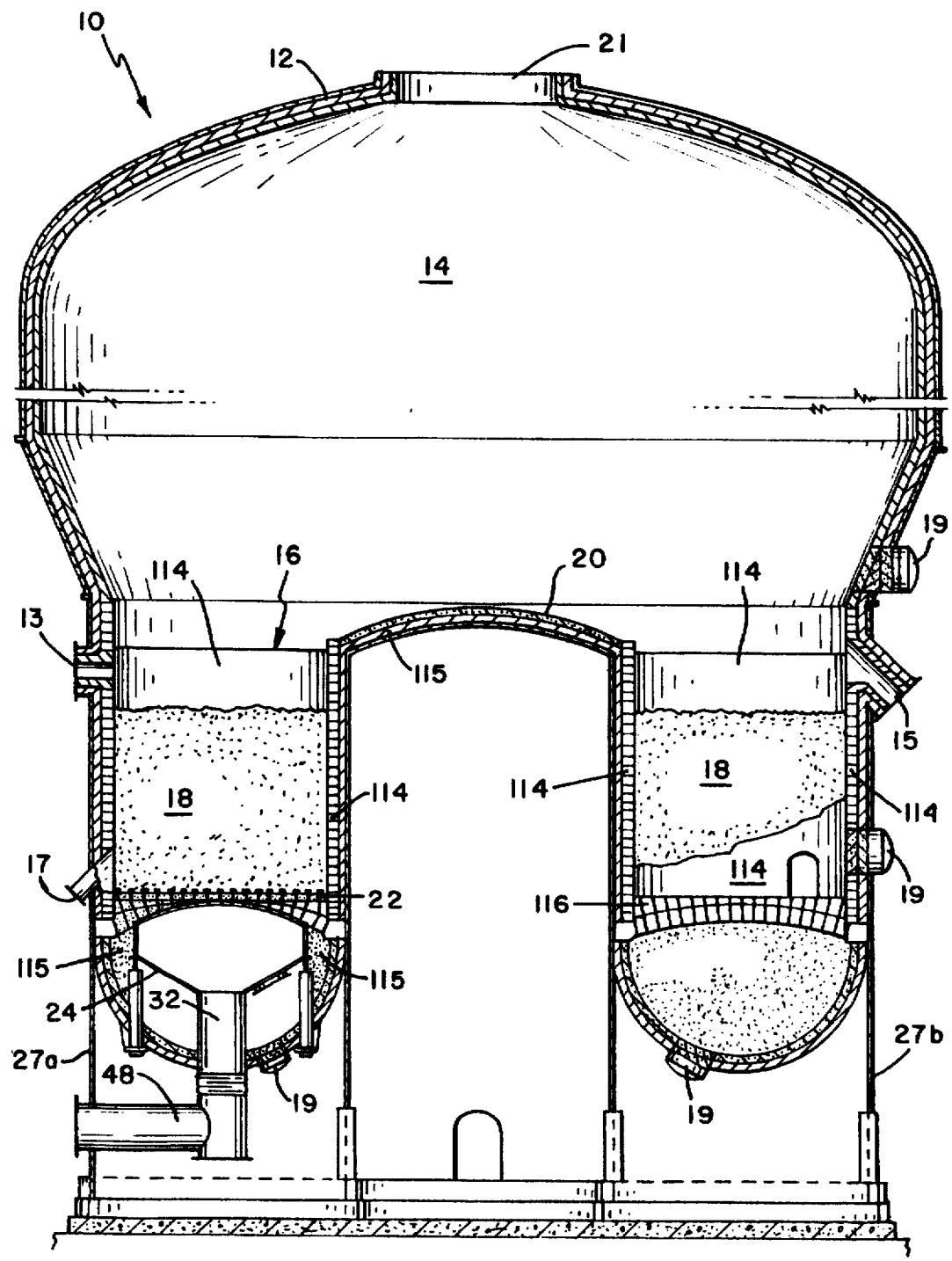
FIG. 1 is a sectional, elevational view of a fluidized bed reactor using the fluidizing gas distributor of the present invention.

In describing the preferred embodiment of the present invention, reference will be made herein to FIGS. 1–16 of the drawings in which like numerals refer to like features of the invention. Features of the invention are not necessarily shown to scale in the drawings.

Referring to FIG. 1, fluidizing bed reactor 10 comprises reactor shell 12 and a plurality of reactor subsystems. All reactor subsystems are identically constructed. Thus, in order to simplify the ensuing description, only reactor subsystem 27a will be described. Subsystem 27a comprises reaction chamber 16, particulate bed 18 contained within chamber 16, support member 22 and gas distributor 24 of the present invention.

Particulate, having been reduced to a predetermined particle size, is fed into feed inlet 13 to form particulate bed 18. Processed particulate is withdrawn from outlet 15. Outlet 17 provides a discharge path for particulate of the particulate bed. Each entrance 19 comprises a manhole cover and is gaseously coupled to reactor shell 12 to provide entry into various parts of the reactor to facilitate maintenance thereof. Off-gases, which are typically comprised of gaseous and entrained solid constituents, pass through outlet 21. Dome 20 is coaxial with the axis of reactor 10 and is attached to all the reactor subsystems to provide structural support.

Figure 3:
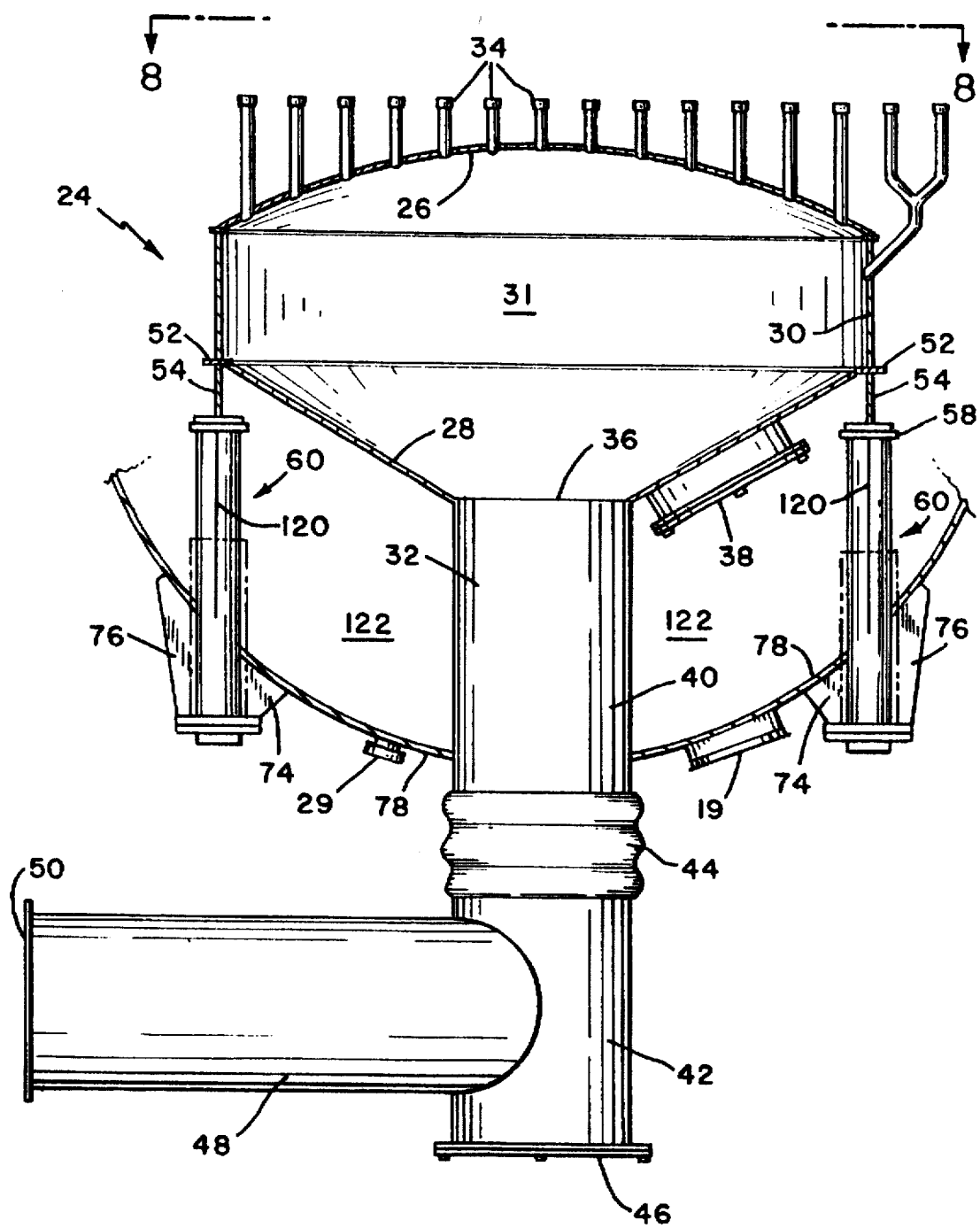
FIG. 3 is an elevational view of the fluidizing gas distributor of the present invention.

Referring to FIG. 3, fluidizing gas distributor 24 of the present invention comprises top portion 26, bottom portion 28 and sidewall 30 which is contiguous with top portion 26 and bottom portion 28. Top portion 26, bottom portion 28 and sidewall 30 form a chamber or vessel having interior region 31 for receiving fluidizing gases from nozzle 32. In a preferred embodiment, distributor 24 is fabricated from metal. Preferably, distributor 24 has a substantially spherical shape or a flattened spherical shape (bubble configuration). The pressure difference between interior 31 of distributor 24 and the surrounding space in reactor 10 is due to the pressure drop of the tuyeres only, regardless of the absolute pressure in reactor 10. The design pressure of distributor 24 is therefore dependent upon this relative pressure only. Thus, the pressure drop through the tuyeres is limited only by the mechanical resistance of distributor 24. Since distributor 24 is a closed vessel, except for the tuyeres 34 and inlet 36 (described below), there is no need for mechanically sealing distributor 24 from the reactor atmosphere or ambient. Different alloys may be used in fabricating distributor 24. If distributor 24 receives fluidizing gases having a significantly high pressure, then it is highly preferable that the alloy used to fabricate distributor 24 be able to withstand such high pressure.

Nozzle 32 will be discussed in detail below. A plurality of tuyeres 34 are gaseously coupled to corresponding openings formed in top portion 26. Tuyeres 34 extend upward from top portion 26 and are disposed within corresponding openings in support member 22 in order to transfer the fluidizing gases from interior region 31 into particulate bed 18.

Bottom portion 28 has a substantially conical shape and has an opening or inlet 36 formed in the apex thereof which is gaseously coupled to nozzle 32. Due to the conical shape of bottom portion 28, any solid particulate entering interior region 31 through tuyeres 34 falls through opening or inlet 36. Bottom portion 28 also has entrance 38 formed therein which comprises a manhole cover that is sealingly connected to bottom portion 28. Entrance 38 provides an entry way into interior region 31 so as to facilitate maintenance thereof. Sidewall 30 is perpendicularly attached to circumferential plate 52. Bottom portion 28 is supported by and attached to plate 52. The connections between sidewall 30 and plate 52, and bottom portion 28 and plate 52, are gas tight connections so as to prevent leakage therethrough of the fluidizing gas.

Support member 22 is substantially flat and has an appropriate thickness to support particulate bed 18. Support member 22 is attached to the reactor shell 12 and is positioned above fluidizing gas distributor 24. Thus, member 22 is supported by reactor shell 12. Preferably, member 22 is fabricated from castable refractory material. Such material is described in commonly owned U.S. Pat. No. 4,073,064, the disclosure of which is incorporated herein by reference. As shown in FIG. 1, castable insulation 115 is disposed between reactor shell 12 and distributor 24, and between support member 22 and top portion 26 of distributor 24.

Nozzle 32 is vertically oriented and comprises a first nozzle portion 40, second nozzle portion 42 substantially coaxial with first nozzle portion 40 and expansion joint 44 interposed between first and second nozzle portions 40 and 42, respectively, to allow each nozzle portion to move freely of the other portion over wide variations in temperature and pressure during operation of the fluidized bed reactor. Nozzle portion 40 movably extends through wall 78. Second nozzle portion 42 has opening 46 that effects drainage of the solid particulate matter that falls through opening 36. Nozzle portions 40 and 42 are preferably comprised of metal.

Fluidizing gas conduit 48 is gaseously connected to a corresponding opening in nozzle section 42. Conduit 48 is preferably fabricated from metal. Opening 50 of conduit 48 is gaseously coupled to a fluidizing gas source (not shown) which provides fluidizing gases that pass through conduit 48, through nozzle portions 40 and 42, into interior region 31, through tuyeres 34 and finally into bed 18. The fluidizing gas maintains particulate 18 in a fluidized state. The fluidizing gas can be air or other oxygen-containing gases.

Figure 4:
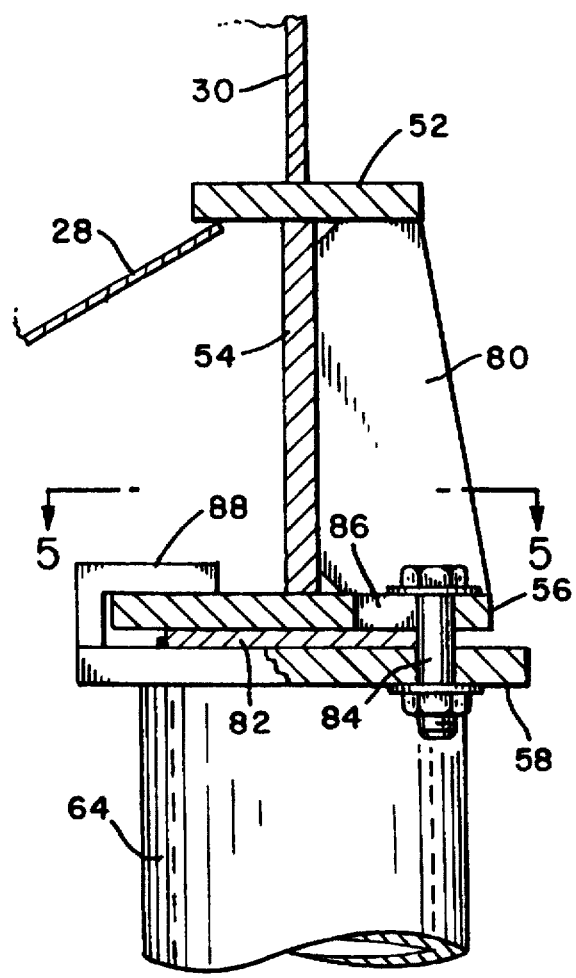
FIG. 4 is an enlarged view of one portion of a structure, shown in FIG. 3, for supporting the fluidizing gas distributor within the reactor.
Figure 5:
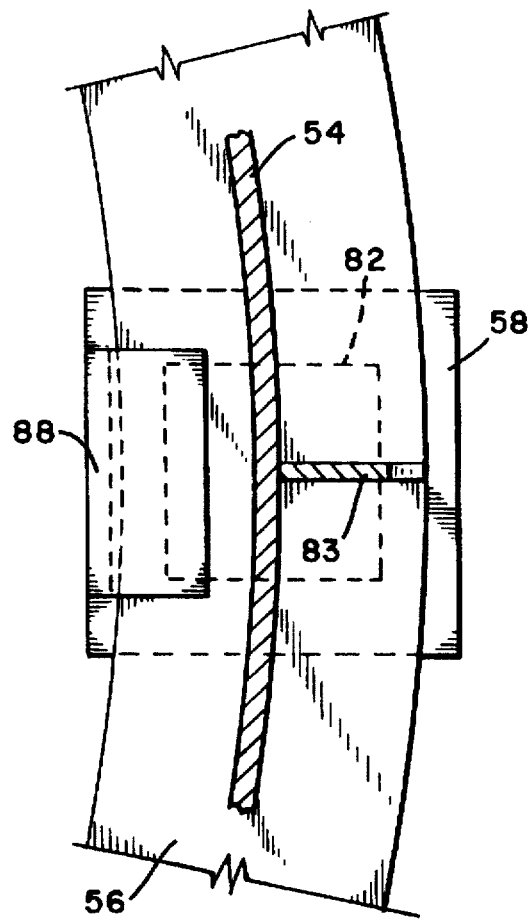
FIG. 5 is a view taken along line 5—5 of FIG. 4.
Figure 4A:
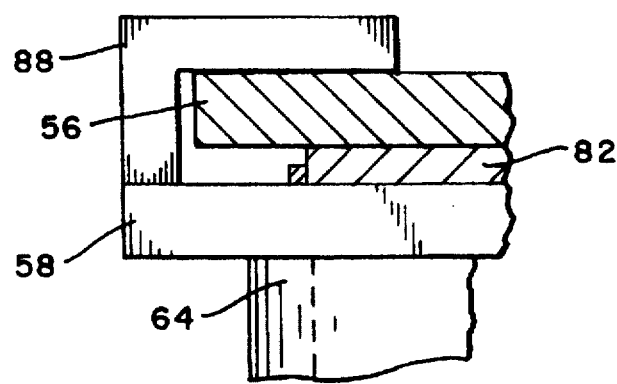
FIG. 4A is a partial, enlarged view of the seal configuration shown in FIG. 4.
Figure 6:
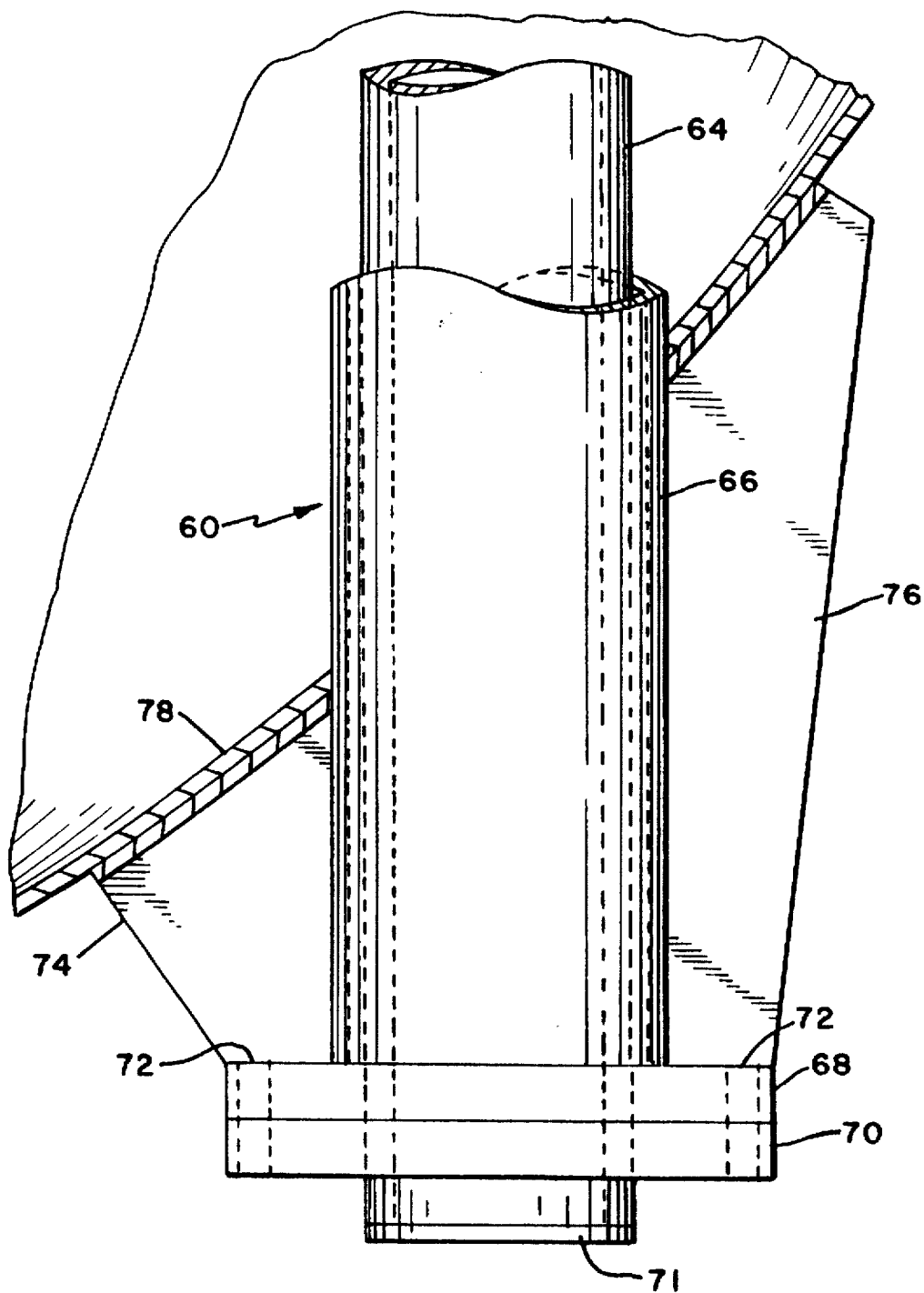
FIG. 6 is an enlarged view of another portion of the structure, shown in FIG. 3, for support the fluidizing gas distributor within the reactor.

Referring to FIGS. 3–6 and 8, distributor 24 is supported by a support structure that comprises circumferential wall 54, circumferential support plate 56, support plate 58 and equidistantly spaced stanchions or support members 60. Referring to FIG. 6, each support member 60 is comprised of cylindrical members 64, 66, flanges 68, 70 and base plate 72. Members 64 and 68 are preferably cylindrical in shape. Member 64 has a smaller diameter than member 68 thereby permitting member 64 to be telescopically disposed within member 66. Base plate 71 is rigidly attached to the end of member 64. Flanges 68 and 70 are rigidly attached to members 64 and 66, respectfully. Gussets 74 and 76 are attached between bottom wall 78 of reactor shell 12 and flange 68. Inlets 72 receive spring-loaded bolts (not shown) for resiliently fastening flanges 68 and 70 together. Support members 60 movably extend through bottom wall 78 of reactor. Thus, the spring-loaded bolts disposed in inlets 72 and the telescopic configuration of members 64 and 66 allow member 64 to move upward with respect to any upward movement of fluidizing gas distributor 24.

Referring to FIG. 4, circumferential wall 54 is perpendicularly attached to plates 52 and 56. Gusset plate 80 is attached to and between plates 52 and 56 to provide structural support. Plate 58 is rigidly attached to the top end of member 64. Expansion plate 82 is interposed between plates 56 and 58 and expands when it is heated. In a preferred embodiment, plate 82 is a Lubrite™ plate which is comprised of a self-lubricated plate. The purpose of plate 82 will be discussed below. FIG. 5 shows a plan view of expansion plate 82 in phantom. Gusset plate 83 is attached to circumferential wall 54 and annular plate 56 so as to provide structural support.

Referring again to FIG. 4, plates 56 and 58 are fastened together by bolt 84. Plate 56 has opening 86 therein which is substantially larger than the diameter of screw 84 thereby permitting two (2) dimensional shifting of plate 56 with respect to plate 58. Expansion plate 82 expands as annular plate 56 shifts thereby substantially reducing friction between annular plate 56 and plate 58.

One portion of substantially "L" shaped bracket 88 is attached to plate 58 and the other portion of bracket 88 is positioned over annular plate 56 so as to prevent any upward movement of annular plate 56 relative to plate 58 and to prevent excessive shifting of annular plate 56.

The telescopic arrangement of members 64 and 66, the spring loaded bolts fastening flanges 68 and 70 together, opening 86 in annular plate 56, expansion plate 82 and expansion joint 44 all cooperate to allow fluidizing gas distributor 24 to shift laterally as well as move upward with minimum mechanical stresses in response to variations in the temperature and pressure within and without distributor 24.

Figure 9:
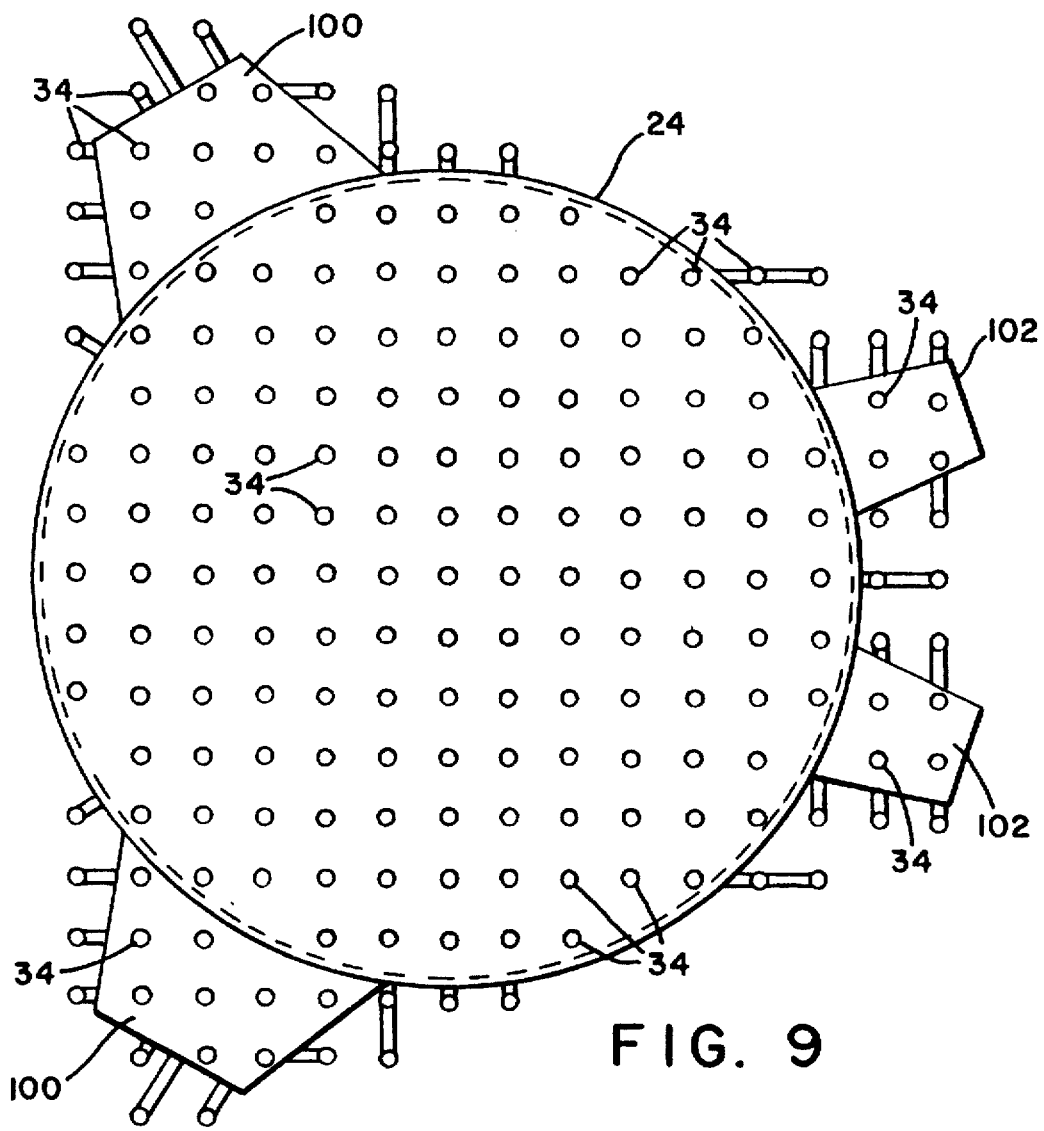
FIG. 9 is a view, similar to FIG. 8, which shows the gas distributor of the present invention having extensions attached thereto.
Figure 11A:
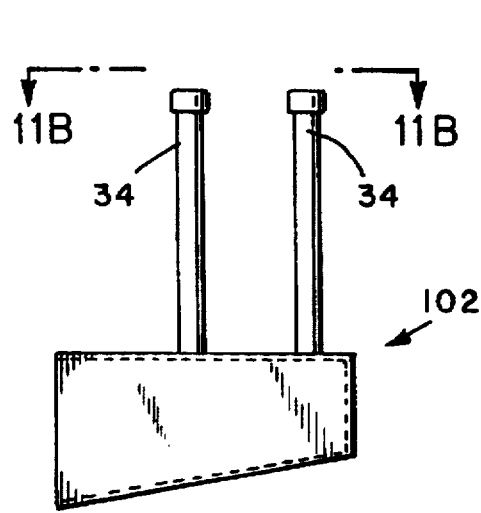
FIG. 11A shows a view, similar to FIG. 10A, of an alternate embodiment of the extension shown in FIG. 10A.
Figure 11B:
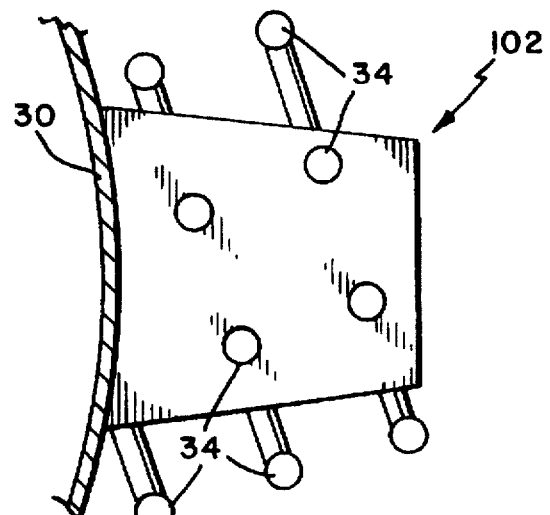
FIG. 11B is a view along line 11B—11B in FIG. 11A.

Referring to FIG. 9, there is shown a top plan view of fluidizing gas distributor 24 which includes extension boxes 100 and 102 operatively attached thereto. The extension boxes permit maximizing the use of the available space in the reactor in order to increase capacity of the reactor. FIGS. 10A and 10B show extension box 100 which is comprised of top portion 104, bottom portion 106 and sidewall sections 108a–c which are contiguous with top portion 104 and bottom portion 106. Top portion 104, bottom portion 106 and sidewall sections 108a–c define an interior region having an open end generally designated by the numeral 110. Extension box 100 further comprises tuyeres 34 attached to top portion 104 and provide gaseous communication between the bed of particulate and the interior of extension box 100. Extension boxes 102 are substantially structurally identical to extension boxes 100 except that boxes 102 are smaller in size than boxes 100. Extension boxes 100 and 102 are attached to distributor 24 such that open ends 110 and 11 2, respectively, are aligned with a corresponding openings in sidewall 30 thereby effecting gaseous communication between the interiors of the extension boxes and interior region 31 of distributor 24. Extension boxes 100 and 102 are aligned such that the bottom portions of each extension box are aligned with bottom portion 28 of distributor 24 so that and solid particulate can freely move from the bottom portion of the extension boxes to bottom portion 28 of distributor 24. The extension boxes may be of any shape that facilitates the utilization of the maximum amount of available space within the reactor.

Figure 2:
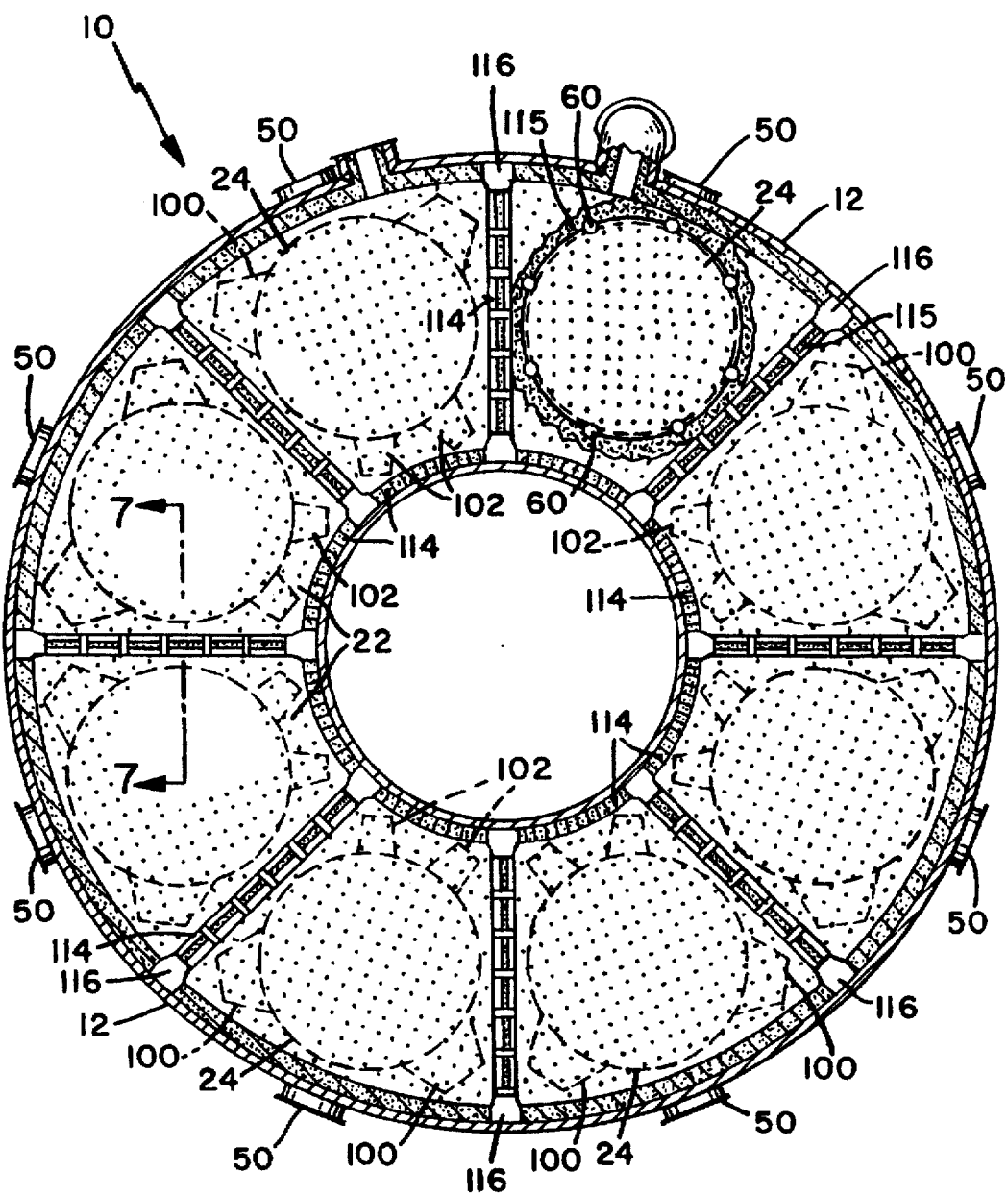
FIG. 2 is a top plan view of the reactor depicted in FIG. 1.

FIG. 2 shows a top plan view of fluidized bed reactor 10 of the present invention which uses a plurality of fluidizing gas distributors 24 arranged in a circular configuration. Each distributor 24 is associated with a corresponding reaction chamber defined by walls 114. Each distributor 24, nozzle assembly 32 and reaction chamber define a separate reactor subsystem, e.g. subsystems 27a and 27b shown in FIG. 1. FIG. 2 also illustrates the positioning of extension boxes 100 and 102 to utilize the maximum amount of space in reactor 10.

In an alternate embodiment, fluidized bed reactor 10, as shown in FIG. 2, uses a plurality of fluidizing gas distributors 24 arranged in a circular configuration wherein each distributor 24 has a toroidal shape.

Figure 7:
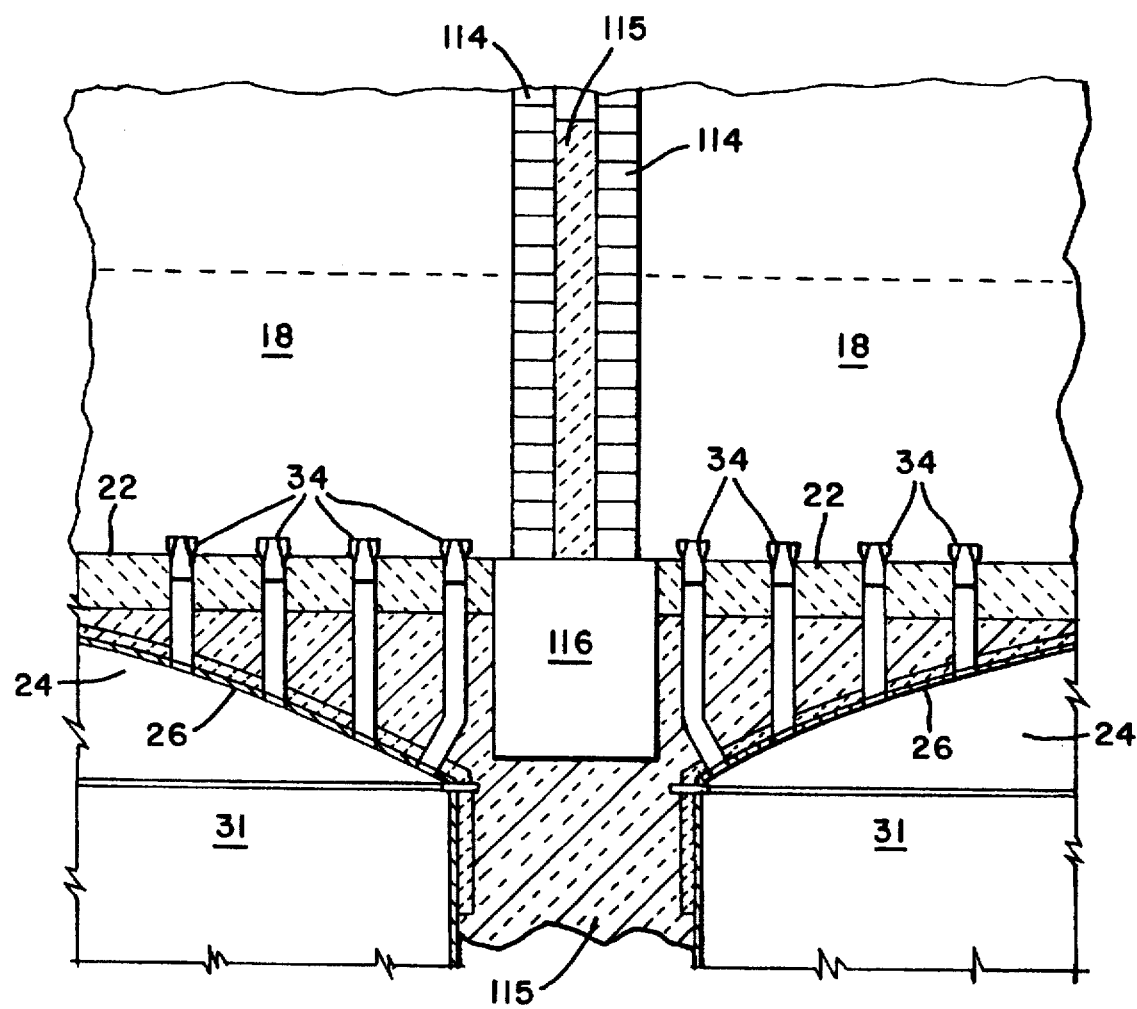
FIG. 7 is a view taken along line 7—7 of FIG. 2.

Referring to FIGS. 1 and 7, each reactor subassembly is separated from an adjacent reactor subassembly by insulation 115 and arches 116. Insulation 115 is preferably a concrete based insulation. System 27b is shown in FIG. 1 without distributor 24 to clearly show one of the arches 116. Each arch 116 is preferably made of a refractory material as described above. Arches 116 support bricks 114, as shown in FIG. 7, which contain the beds of particulate 16.

Referring to FIG. 3, each reactor subsystem includes labyrinth-type seal 120 that is attached to the underside of plate 58 and extends downward into telescoping member 64. Seal 120 prevents particles of insulation from penetrating interior region 122 below bottom portion 28 of distributor 24.

Drain 29 is formed in lower portion 78 of reactor shell 12 and permits the drainage of any particles of insulation or any particulate of bed 18 that enter interior region 122.

Thus, the present invention provides an improved fluidized bed reactor that utilizes a plurality distributors 24 positioned to produce a bed having a specific shape that is independent of the shape of the reactor. Therefore, the arrangement of the distributors 24 within the reactor may be that of any pattern, e.g. round, annular, circular etc. Such a feature also facilitates maximizing the utilization of available space within the reactor and avoids the problems of expansion, deformation, warping sealing, etc. which typically accompany large conventional metallic distributors when heated. As shown above, the improved fluidized bed reactor avoids the problems of high mechanical stress, diameter limitations, differential pressure limitations typical of refractory domes and makes possible the construction of very large diameter fluidized bed reactors with a high pressure drop across the tuyeres.

The pressure drop across tuyeres 34 represents the operating relative pressure of the distributor. The pressure drop is only limited by the tolerable stresses in the containing walls of the distributor 24. A plurality of distributors of smaller size permit relatively higher pressure drops, all other conditions being equal.

The shape and size of the distributor 24 and the location of the distributor within reactor shell 12 may be configured to the specific dimensions of a particular reactor. Each distributor may have a size or shape that is different than of that the reactor containing the distributor. Furthermore, the reactor diameter and mechanical design in general is not effected or limited by the requirements of distributor 24. Each distributor can have a shape other than round. For example, each distributor 24 may have a shape that is substantially spherical, bubble, rectangular, trapezoidal etc.

The bottom portion of each distributor is profiled so as to allow draining by gravity of any granule solids, i.e., insulation particles of particulate of bed 18, etc. Expansion joints may be used to attach each distributor to reactor shell 12 so as to allow movement of each distributor with respect to variations in temperature and pressure during the operation of the reactor. As described above, each distributor can freely expand in the reactor. Thus, no forces, except for the weight of the distributor, are transmitted to the reactor shell or the refractory lining.

When a plurality of distributors 24 are used, the distributors radially expand with respect to reactor shell 12, starting from the vertical center line of the distributor and normally coinciding with the inlet gas nozzle, rather than from the reactor vertical center line. Such a configuration facilitates expansion of the distributors with respect to the reactor shell in response to variations in temperature and pressure during the operation of the reactor.

Furthermore, distributors 24 can be mutually arranged in the reactor 10 so as to produce an overall pattern to comply with a specific bed shape, in particular, a toroidal shape. The distributors are mutually arranged in such a manner as to permit installation, between adjacent distributors, of vertical baffles so as to separate the fluid bed into a number of individual cells.

Figure 12:
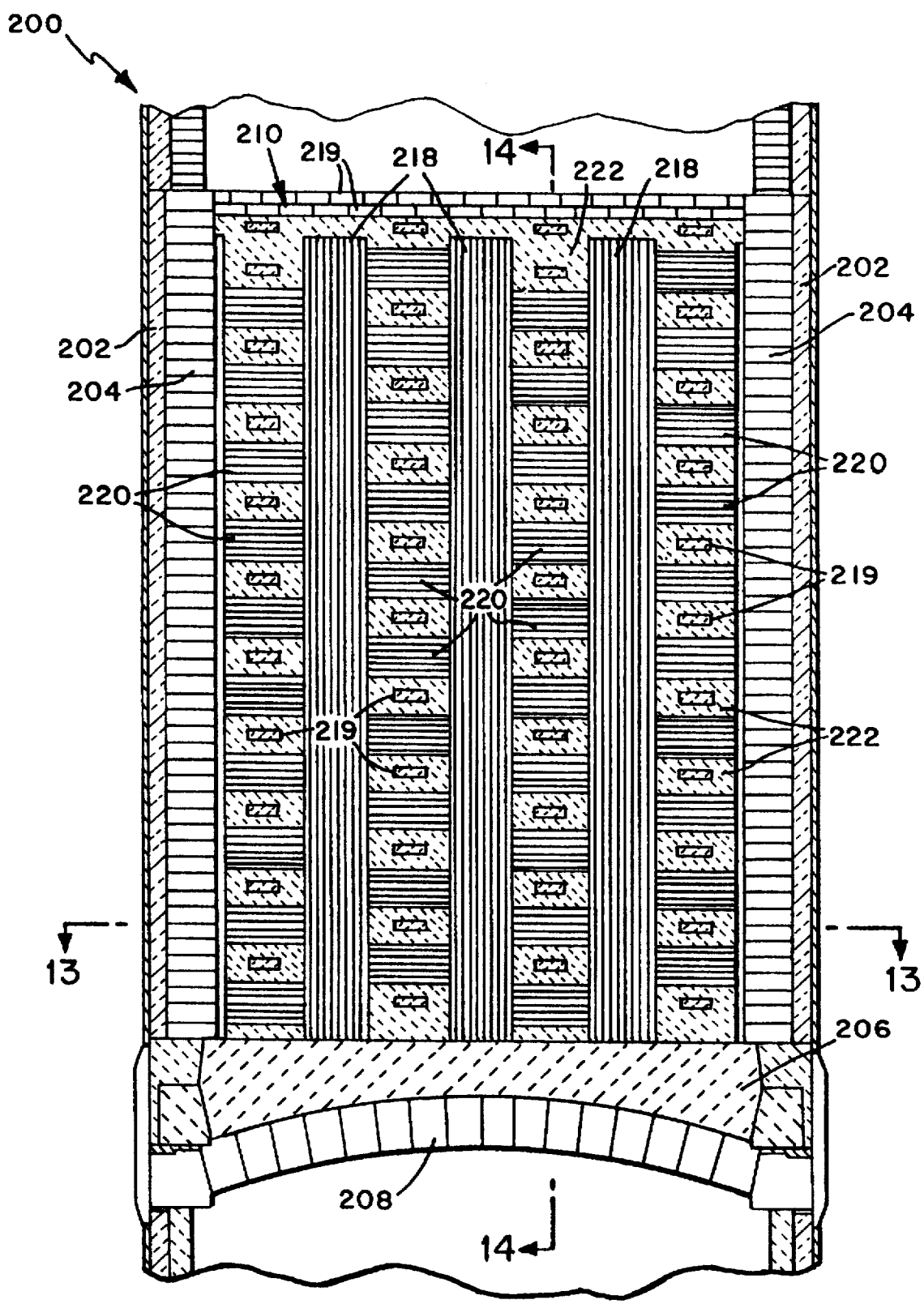
FIG. 12 is a sectional, elevational view of a reaction chamber of a fluidized bed reactor using the baffle of the present invention.

In accordance with the present invention, the baffle design of the present invention is used to separate or divide the fluidized bed of a reaction chamber into sections. Referring to FIG. 12, reaction chamber 200 is includes insulating castable members 202, vertically stacked refractory bricks 204 adjacent and attached to members 202, refractory bed dome 206 and arch support 208.

Figure 13:
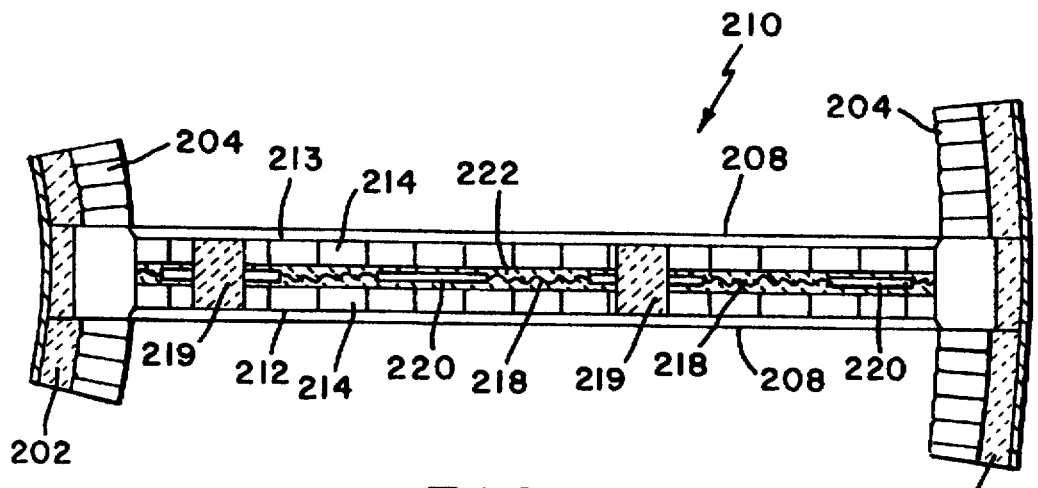
FIG. 13 is a view taken along line 13—13 of FIG. 12.

Referring to FIGS. 12–14, baffle 210 comprises three (3) layers. However, in order to simplify the ensuing discussion, wall 212 is not shown in FIG. 12. Outer walls 212 and 213 each comprise interlocking or tongue and groove refractory bricks 214. In a preferred embodiment, a high-temperature mortar is used to attach the bricks that form walls 212 and 213. Outer walls 212 and 213 are resistant to abrasion and corrosion. Furthermore, walls 212 and 213 are thermally stable over variations in temperature within the reactor. Intermediate layer 216 comprises steel alloy reinforcement members 218 and 220 (see FIG. 12) embedded in a castable refractory 222. In a preferred embodiment, reinforcement members 218 are equidistantly spaced and vertically oriented steel alloy corrugated panels. In a preferred embodiment, reinforcement members 220 are equidistantly spaced and horizontally oriented steel alloy corrugated panels. Members 220 are spaced between and attached to members 218. Furthermore, as shown in FIG. 12, it is preferred if each row members 220 is staggered with respect to the preceding and succeeding row. However, members 218 and 220 may have other structural shapes and extrusions, such as pipes, tubings, rods, wire or plate meshes, perforated plates and gratings. Intermediate wall or layer 216 provides structural reinforcement to improve the overall strength and rigidity of the baffle. Tie bricks 219 facilitate attachment of outer walls 212 and 213 to intermediate wall 216. Baffle 210 is embedded in high strength castable member 209. The top of baffle 210 is capped with two horizontal rows of bricks 219. Referring to FIG. 13, baffle 210 is secured to the reaction chamber walls which are defined by castable members 202 and bricks 204. Referring to FIG. 14, baffle 210 is also secured to the reaction chamber bottom surface which is comprised of castable member 209.

The thicknesses and the number of layers of each baffle may be adjusted to suit particular height, bed depth and overall load requirements of a reaction chamber.

The baffles of the present invention may be configured to have any shape walls, e.g. flat, curve, circular, etc. If the baffles are circular in shape, the such baffles would be attached only to the bottom portion of the reaction chamber. Furthermore, the baffles may be configured to have openings therein to transfer the fluidized bed from one section to another. The baffles of the present invention may also be used in any shaped reaction chamber, e.g. circular, toroidal, rectangular, etc.

Figure 15:
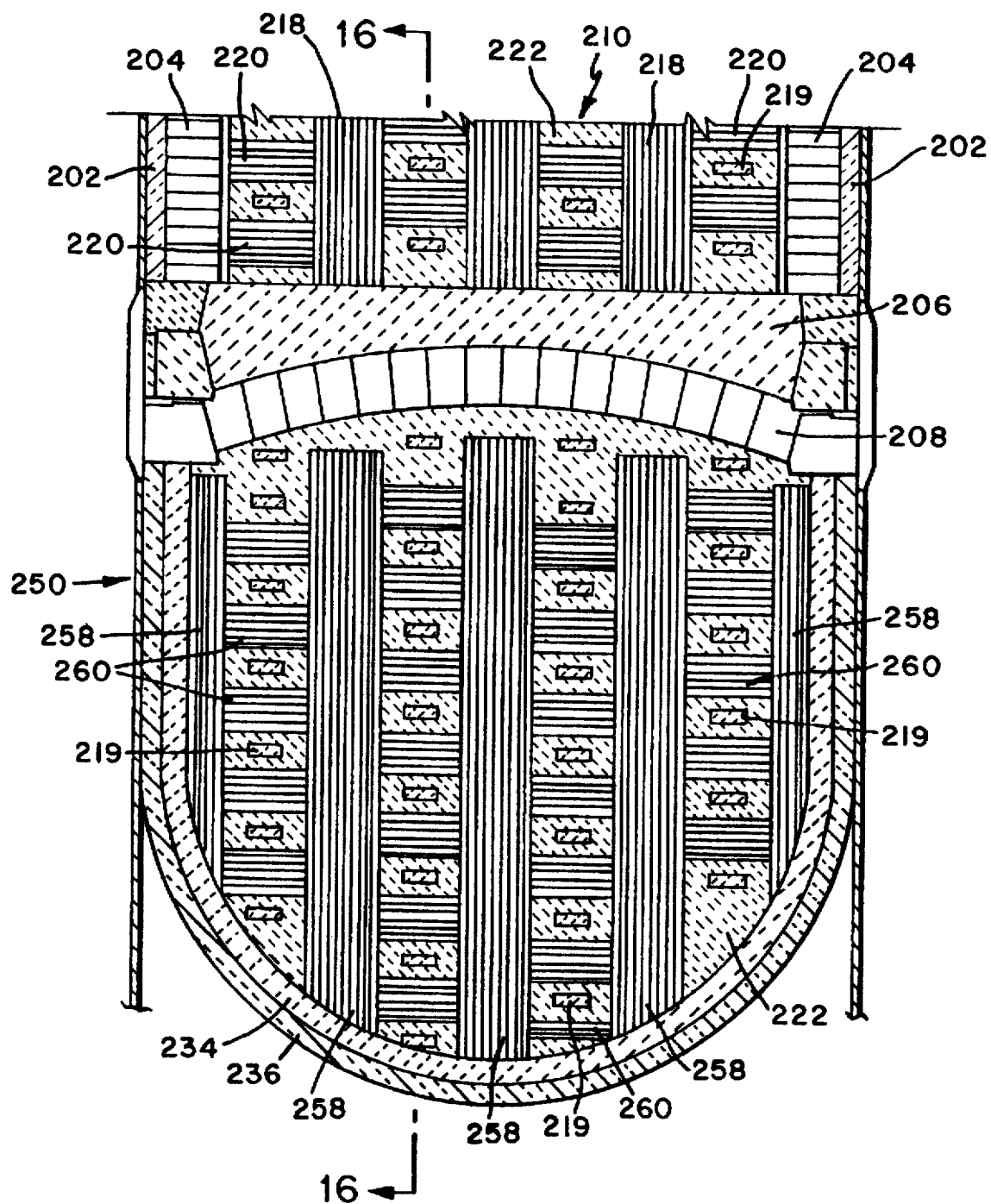
FIG. 15 is a partial, side elevational view of a lower portion of the reaction chamber shown in FIG. 12.

The baffle of the present invention may also be used as a dividing wall in the windbox and the freeboard sections of the reactor. As shown in FIG. 15, baffle 250 is positioned within windbox 232. Referring to FIG. 16, baffle 250 is identical in construction to baffle 210 described above. Baffle 250 comprises outer walls 252, 254 and intermediate wall 256 which are substantially identically in construction to walls 212, 213 and 216, respectively. In order to simplify the discussion of baffle 230, wall 252 is not shown in FIG. 15. Intermediate layer 256 comprises metallic reinforcement members 258 and 260 (see FIG. 16) embedded in a castable refractory. In a preferred embodiment, the metallic reinforcement members are fabricated from steel alloy. As shown in FIG. 15, baffle 250 is secured to the windbox walls which are comprised of walls 234 and 236. Layer 234 is fabricated from a high strength castable material. Layer 236 is comprised of a castable insulating material. The bottom portion of baffle 250 is configured to match the curved or semi-circular contour of the bottom wall of the reactor. The bottom wall of the reactor is comprised of layers 234 and 236.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An improved fluidized bed reactor having a reactor shell and a reaction chamber within the shell, the reaction chamber having chamber walls and a bottom portion, the improvement comprising:

at least one baffle disposed within the reaction chamber, the baffle comprising a pair of outer refractory walls, an inner refractory wall between and contiguous with the outer refractory walls, and a metallic reinforcement member embedded within the inner refractory wall, the inner and outer walls being attached to at least the bottom portion of the chamber.

2. The improved fluidized bed reactor as set forth in claim 1 wherein each pair of outer refractory walls is comprised of interlocking bricks.

3. The improved fluidized bed reactor as set forth in claim 1 wherein the metallic reinforcement member is fabricated from a steel alloy.

4. The improved fluidized bed reactor as set forth in claim 3 wherein the reinforcement member comprises a plurality of substantially vertically arranged corrugated panels spaced apart, and a plurality of substantially horizontally arranged corrugated panels positioned between and attached to the vertically arranged panels.

5. The improved fluidized bed reactor as set forth in claim 3 wherein the reinforcement member comprises a perforated plate.

6. The improved fluidized bed reactor as set forth in claim 1 wherein the inner and outer walls are also attached to the chamber walls.

7. The improved fluidized bed reactor as set forth in claim 3 wherein the reinforcement member comprises a plurality of substantially vertically and horizontally arranged rods attached to one another to form a grid.

8. The improved fluidized bed reactor of claim 1 wherein the baffle is substantially flat.

9. The improved fluidized bed reactor as set forth in claim 1 wherein the baffle has an opening formed therein to allow the transfer of bed of particulate.

10. An improved fluidized bed reactor having a reactor shell and at least one reactor subsystem within the shell, the reactor subsystem having a reaction chamber, the reaction chamber having chamber walls and a chamber bottom portion, the improvement comprising:

at least one fluidizing gas distributor positioned beneath the reaction chamber, the distributor comprising a top portion, a bottom portion and a sidewall contiguous with the top portion and the distributor bottom portion to define an interior, the distributor bottom portion having an inlet formed therein for introducing a fluidizing gas to the interior, a plurality of tuyeres attached to the top portion of the distributor for providing gaseous communication between the reaction chamber and the distributor interior; and at least one baffle disposed within the reaction chamber, the baffle comprising a pair of outer refractory walls, an inner refractory wall between and contiguous with the outer refractory walls, and a metallic reinforcement member embedded within the inner refractory wall, the inner and outer walls being attached to at least the chamber bottom portion.

11. A fluidized bed reactor comprising:

a reactor shell having a reaction chamber within the shell, the reaction chamber having chamber walls and a chamber bottom portion; and at least one baffle disposed within the reaction chamber, the baffle comprising a pair of outer refractory walls, an inner refractory wall between and contiguous with the outer refractory walls, and a metallic reinforcement member embedded within the inner refractory wall, the walls being attached to at least the chamber bottom portion.

12. A fluidized bed reactor comprising:

a reactor shell and at least one reactor subsystem within the shell, the reactor subsystem having a wall and reaction chamber, the reaction chamber having chamber walls and a chamber bottom portion;

at least one fluidizing gas distributor positioned beneath the reaction chamber, the distributor comprising:

- a top portion, a bottom portion and a sidewall contiguous with the top portion and the bottom portion to define an interior, the bottom portion having an inlet formed therein for introducing a fluidizing gas to the interior,
- a plurality of tuyeres attached to the top portion of the distributor for providing gaseous communication between the reaction chamber and the distributor interior,
- a nozzle in gaseous communication with the inlet in the bottom portion for introducing a fluidizing gas to the distributor interior, and
- a support structure having a first portion attached to the distributor and a second portion rigidly attached to the wall of the subsystem, the first portion being movable with respect to the second portion to allow the fluidizing gas distributor to move in response to variations in temperature and pressure within the reactor subsystem; and at least one baffle positioned within the reaction chamber, the baffle comprising a pair of outer refractory walls, an inner refractory wall between and contiguous with the outer refractory walls, and a metallic reinforcement member embedded within the inner refractory wall, the inner and outer walls being attached to the chamber walls and the chamber bottom portion.

13. An improved fluidized bed reactor having a reactor shell, a reaction chamber within the shell, and a windbox within the shell and below the reaction chamber, the windbox having a wall, the improvement comprising:

at least one baffle positioned within windbox to divide the windbox into sections, the baffle comprising a pair of outer refractory walls, an inner refractory wall between and contiguous with the outer refractory walls, and a metallic reinforcement member embedded within the inner refractory wall, the inner and outer walls being attached to the windbox wall.

* * * * *